US007000091B2

(12) United States Patent
Schlansker

(10) Patent No.: US 7,000,091 B2
(45) Date of Patent: Feb. 14, 2006

(54) SYSTEM AND METHOD FOR INDEPENDENT BRANCHING IN SYSTEMS WITH PLURAL PROCESSING ELEMENTS

(75) Inventor: Michael S. Schlansker, Los Altos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 631 days.

(21) Appl. No.: 10/215,095

(22) Filed: Aug. 8, 2002

(65) Prior Publication Data

US 2004/0030872 A1 Feb. 12, 2004

(51) Int. Cl.
G06F 15/76 (2006.01)

(52) U.S. Cl. .................................... 712/24; 712/234
(58) Field of Classification Search ............... 712/234, 712/1–24, 222; 709/201–253
See application file for complete search history.

(56) References Cited

U.S. PATENT DOCUMENTS

| 5,021,945 | A | * | 6/1991 | Morrison et al. ........... 712/216 |
| 5,050,070 | A | * | 9/1991 | Chastain et al. ............ 712/203 |
| 5,127,092 | A | * | 6/1992 | Gupta et al. ................ 712/234 |
| 5,333,280 | A | * | 7/1994 | Ishikawa et al. ............ 712/241 |
| 5,590,356 | A | * | 12/1996 | Gilbert ........................ 712/31 |
| 5,659,722 | A | * | 8/1997 | Blaner et al. ............... 712/234 |
| 5,708,836 | A | * | 1/1998 | Wilkinson et al. ............ 712/20 |
| 5,809,294 | A | * | 9/1998 | Ando .......................... 712/233 |
| 6,054,871 | A | | 4/2000 | New |
| 6,255,849 | B1 | | 7/2001 | Mohan |

FOREIGN PATENT DOCUMENTS

| WO | WO01/53933 | 7/2001 |
| WO | WO03/003196 | 1/2003 |
| WO | WO03/058433 | 7/2003 |

OTHER PUBLICATIONS

U.S. Appl. No. 10/214,990, Schlansker, et al.
U.S. Appl. No. 10/215,300, Schlansker.
Wolfe, A., et al, "A Variable Instruction Stream Extension to the VLIW Architecture," ASPLOS IV, (1991) pp. 2-14.
Newburn, C.J., et al, "Balancing Fine- and Medium-Grained Parallelism in Scheduling Loops for the XIMD Architecture," Architecture and Compilation Techniques for Fine and Medium Grain Parallelism (A-23), (1993) pp. 39-52.

(Continued)

Primary Examiner—Eddie Chan
Assistant Examiner—Ryan Fiegle

(57) ABSTRACT

The invention is a system and method for executing a program that comprises a plurality of basic blocks on a computer system that comprises a plurality of processing elements. The invention generates a branch instruction by one processing element of the plurality of processing elements, sends the branch instruction to the plurality of processing elements. The invention then independently branches to a target of the branch instruction by each of the processing elements of the plurality of processing elements when each processing element receives the sent branch instruction. At least one processing element of the plurality of processing elements receives the branch instruction at a time later than another processing element of the plurality of processing elements.

23 Claims, 4 Drawing Sheets

OTHER PUBLICATIONS

"What is Compiler-Oriented Architecture?," [online] [Retrieved on: Feb. 26, 2002] Retrieved from: www.ece.purdue.edu/ hankd/CARPVIEW/index.html, pp. 1-5, 1995.

Mirsky, Bhan, et al, "Matrix: A Reconfigurable Computing Architecture with Configurable Instruction Distribution and Deployable Resources," [online] [Retrieved on: Feb. 26, 2002] Retrieved from: www.cs.caltech.edu/research/ic/transit/tn127/tn127.html, pp. 1-14.

"1.62 Multiple Instruction Multiple Data (MIMD)," [online] [Retrieved on: Feb. 26, 2002] Retrieved from: www.epcc.ed.ac.uk/epcc-tec/documents/intro-course/Intro.book_11.html, pp. 1-3.

"VLIW at IBM Research," [online] [Retrieved on: Feb. 26, 2002] Retrieved from: www.research.ibm.com/vliw/, pp. 1-2.

"An Introduction to Very-Long Instruction Word (VLIW) Computer Architecture," Phillips Semiconductors, pp. 1-11.

* cited by examiner

SYSTEM AND METHOD FOR INDEPENDENT BRANCHING IN SYSTEMS WITH PLURAL PROCESSING ELEMENTS

CROSS-REFERENCE TO RELATED APPLICATIONS

The present application is related to copending and commonly assigned U.S. patent application Ser. No. 10/214,990 entitled "Branch Reconfigurable Systems and Methods," filed concurrently herewith, the disclosure of which is hereby incorporated by reference.

FIELD OF THE INVENTION

This invention relates in general to computers, and in specific to a system and method that permits variable latency in branching operations.

BACKGROUND OF THE INVENTION

Typical general purpose computer systems comprise one of many different architectures. Architecture, as used herein, refers to the instruction set and resources available to a programmer for a particular computer system. Thus, architecture includes instruction formats, instruction semantics, operation definitions, registers, memory addressing modes, address space characteristics, etc. An implementation is a hardware design or system that realizes the operations specified by the architecture. The implementation determines the characteristics of a microprocessor that are most often measured, e.g. price, performance, power consumption, heat dissipation, pin number, operating frequency, etc. Thus, a range of implementations of a particular architecture can be built, but the architecture influences the quality and cost-effectiveness of those implementations. The influence is exerted largely in the trade-offs that must be made to accommodate the complexity associated with the instruction set.

Most architectures try to increase efficiency in their respective implementations by exploiting some form of parallelism. For example, in single instruction multiple data stream (SIMD) architecture implementations, the various processing elements (PEs) can all perform the same operation at the same time, each with its own local (different) data.

One common architecture is the very long instruction word (VLIW) architecture. Although very similar to SIMD systems, in VLIW system, each PE can perform a different operation independent of the other PEs. However, the grouping of the sets of operations that PEs can execute together is static. In other words, the choice of which operations that can simultaneously execute together is made at compile time. Moreover, their execution is synchronous. This means that each of the PEs is processing the instructions in a lock-step manner. Note that VLIW PEs are sometimes referred to as function units (FUs), because some PEs within a VLIW system may support only certain types of operations.

VLIW processors are wide-issue processors that use static scheduling to orchestrate the execution of a number of parallel processor elements. VLIW processors have constant branch latency. When a branch is executed on one of a multiplicity of processing elements, the effect of the branch occurs simultaneously on all processor elements. That is, if a branch issued on the t-th cycle and the branch latency is q cycles, all function units begin execution of code at the branch target at cycle t+q.

VLIW processors use a program counter to index into an instruction memory to select an instruction that is used to simultaneously control all processing elements. Since the instruction is taken from the instruction memory in a single atomic action, program text that is taken from the instruction memory after a branch is available to all function units on the same program cycle.

Since the processing elements are physically separate from each other, a branch that occurs in an originating processing element may take different amounts of time to reach each of the processing elements. VLIW scheduling requires that the branch would have to take effect at all processing elements at the same time. Thus, the branch command at the closest processing element would have to be delayed for a time equal to the branch delay to the farthest processing element.

FIG. 4 depicts a conventional scheduling model that has uniform latency. Basic blocks of program code are labeled block 1 401, block 2 402, and block 3 403. Increasing time is represented by moving downward one row for each clock cycle. This VLIW system is a 5-way VLIW processor and has five processing elements operating on the basic blocks, as represented by the columns. This system has a branch latency of 3 cycles, thus it takes 2 additional cycles after a branch is encountered for all of the processing elements to receive the branch. As shown in FIG. 4, the first processing element forms a conditional branch B 404 while processing the $6^{th}$ cycle of basic block 1 401. This conditional branch may lead to processing of block 2 402 or block 3 403, depending upon whether the condition is satisfied or not. For example, block 2 402 may be processed if the condition is not satisfied, i.e. falls through, and block 3 403 may be processed if the condition is met, i.e. branch taken. Note that the fall-though block is normally contiguous in memory with the prior block from which the branch was issued.

In any event, the first processing element cannot immediately begin execution on either block 2 or block 3, but rather must wait for 2 cycles until all of the other processing elements are ready to move to the next block. This two cycle branch delay causes a gap between the location of the branch in the code and the actual end of the basic block. This gap is called the branch shadow. Operations within the two cycle branch shadow execute unconditionally as if the branch has not yet been executed. Useful operations which should execute irrespective of the branch condition or no-ops 406 may be executed within the branch shadow, however, for any operation that should not execute when the branch is taken, the operation must appear below this two cycle window.

After waiting, all of the processing elements then move to either block 2 or block 3. For example, the first processing element starts execution at either location 405 or 407, of blocks 2 or 3, respectively. During processing of block 2 or block 3, another branch would be encountered, e.g. branch 408 or 409, which would change the flow of the program to other basic blocks (not shown). Again, because of the three cycle branch latency, the branch originating processing element would wait for two additional cycles before processing the subsequent basic block so that the other processing elements would have received the branch.

A problem with this arrangement is the cycles lost to waiting for the branch latency. For programs with a great deal of branches, these lost cycles can greatly reduce the efficiency of the system.

BRIEF SUMMARY OF THE INVENTION

An embodiment of the invention is a system and method for executing a program that comprises a plurality of basic blocks on a computer system that comprises a plurality of processing elements. This invention generates a branch instruction by one processing element of the plurality of processing elements and sends the branch instruction to the plurality of processing elements. This invention embodiment then independently branches to a target of the branch instruction by each of the processing elements of the plurality of processing elements when each processing element receives the sent branch instruction. At least one processing element of the plurality of processing elements receives the branch instruction at a time later than another processing element of the plurality of processing elements.

DETAILED DESCRIPTION

The invention uses a computer architecture that supports the VLIW mode of operation, but preferably relaxes the timing constraint in processing branch executions. Thus, each processing element may preferably begin processing the branch to the next basic block as soon as it is received. Thus, latency time for the time of flight for the branch instructions does not have to be padded so that all processing elements begin the next basic block simultaneously. During compilation, the compiler may model the program and the hardware in such a way that the differential flight time with regards to the processing of the basic blocks is accounted for in the schedule. Thus, the compiler can map the scheduling of the program with respect to the flight time of branch instructions and the destinations of the branches. Such flight time can preferably be tabulated by the compiler, and represented as a table of vectors that defines time from an originating processing element to the destination processing elements, which preferably includes the originating processing element. The hardware would then be able to allow processing elements to branch as soon as the branch is received, rather than padding branch flight time into the processing elements. Thus, the invention realizes higher performance than a conventional VLIW processor.

The inventive differential branch latency VLIW preferably allows for different processing elements to respond to a single branch command at different points in time. A closer processing element may respond more quickly than a farther processing element. The invention preferably allows compilers to accommodate non-uniform scheduling models. This allows processing to begin within a new basic block at lower latency within certain processing elements than would otherwise be possible if all latencies were padded to a maximal latency.

Figure 1:
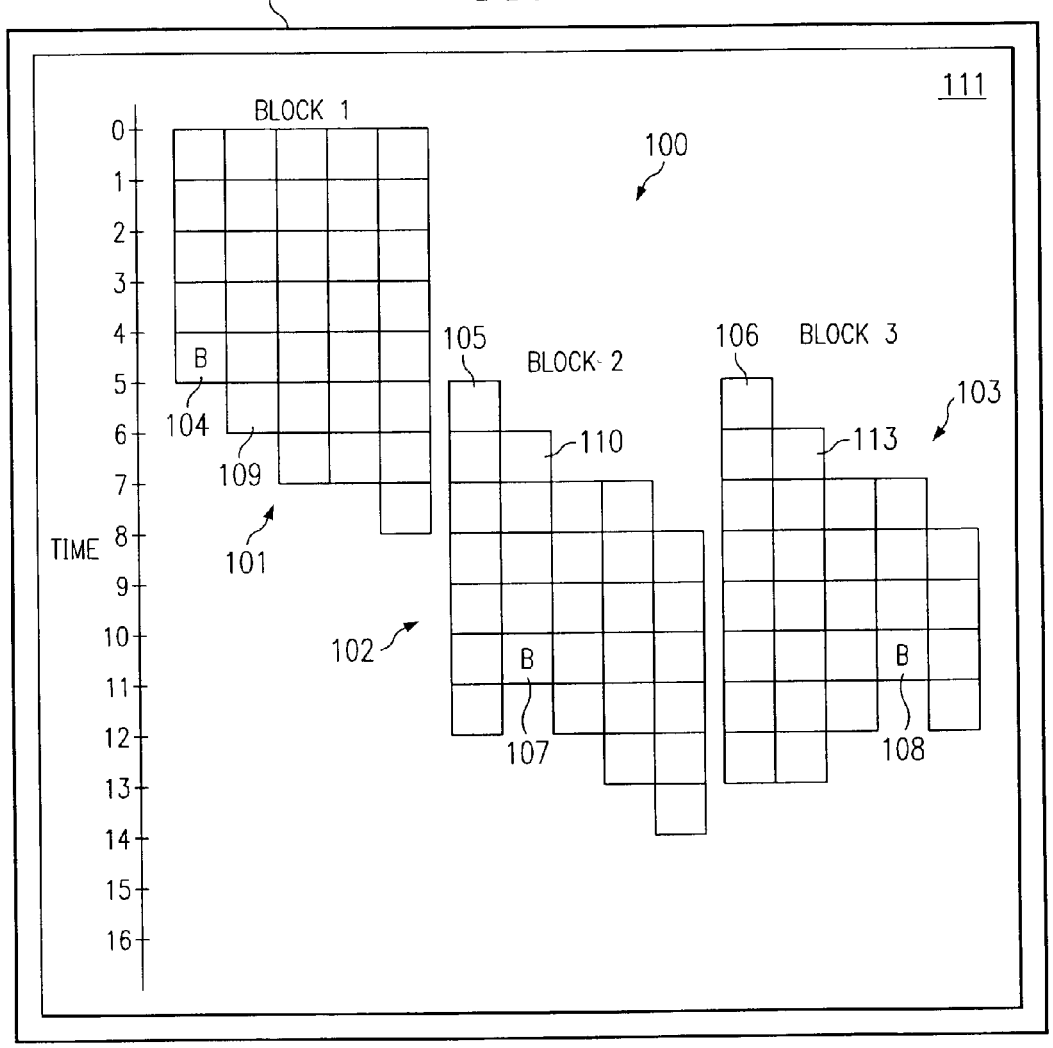
FIG. 1 is block diagram depicting an example of a program schedule formed by a compiler, according to an embodiment of the invention.

FIG. 1 depicts a block diagram of an example of a schedule 100 of the processing of basic blocks according to one aspect of the invention. The scheduling is performed by compiler 111 operating on computer 112. In referring to FIG. 3, during compilation 31, the schedule for the program is developed 33. Basic blocks of program code are labeled block 1 101, block 2 102, and block 3 103. Increasing time is represented by moving downward one row for each clock cycle. The system is preferably a VLIW system, and as shown is a 5-way VLIW processor and has five processing elements operating on the basic blocks, as represented by the columns. This system has a maximum branch latency of 4 cycles, thus it takes 3 additional cycles after a branch is encountered for all of the processing elements to receive the branch.

Figure 3:
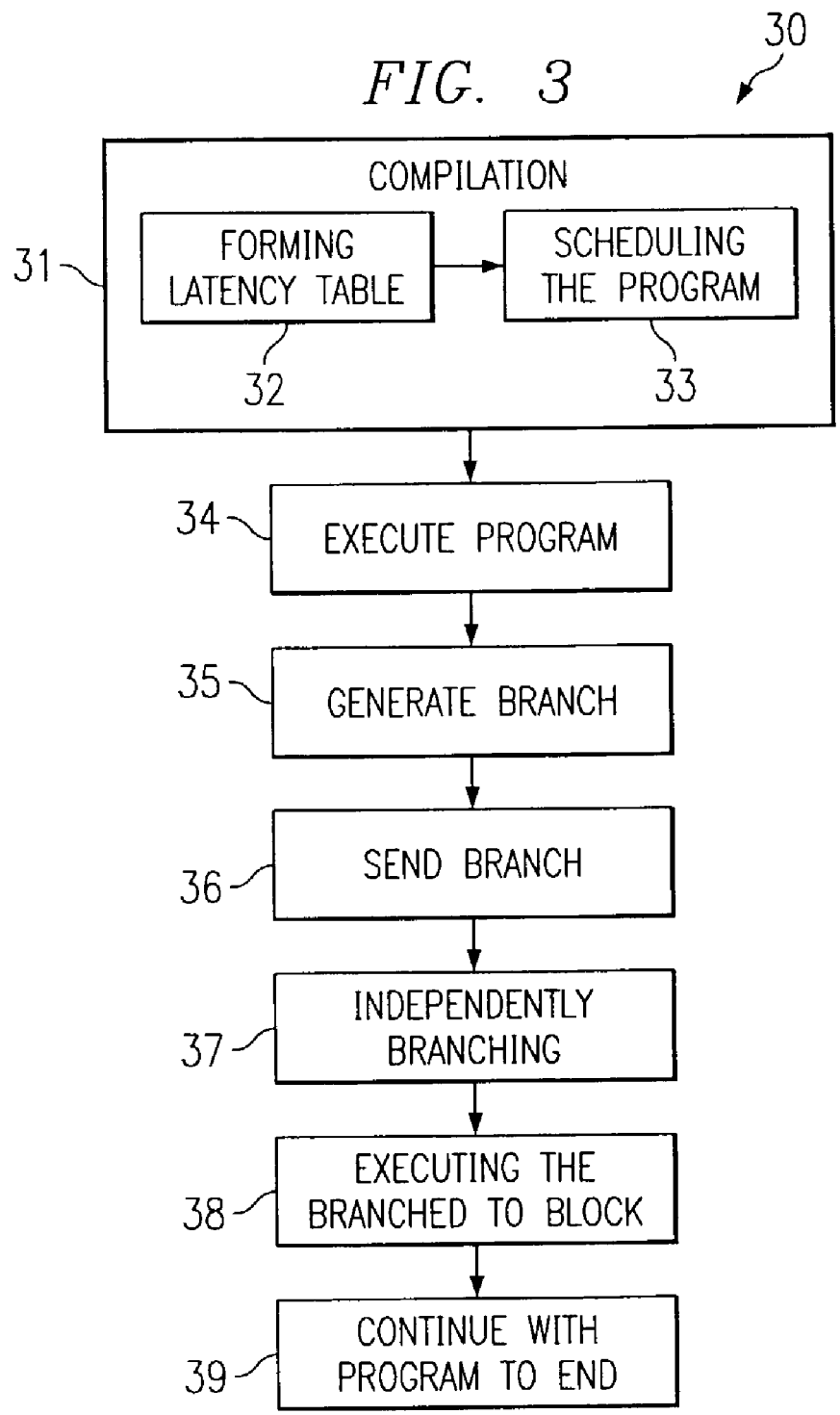
FIG. 3 depicts a flow chart showing aspects of the compilation and execution of a program, according to an embodiment of the invention.
Figure 4:
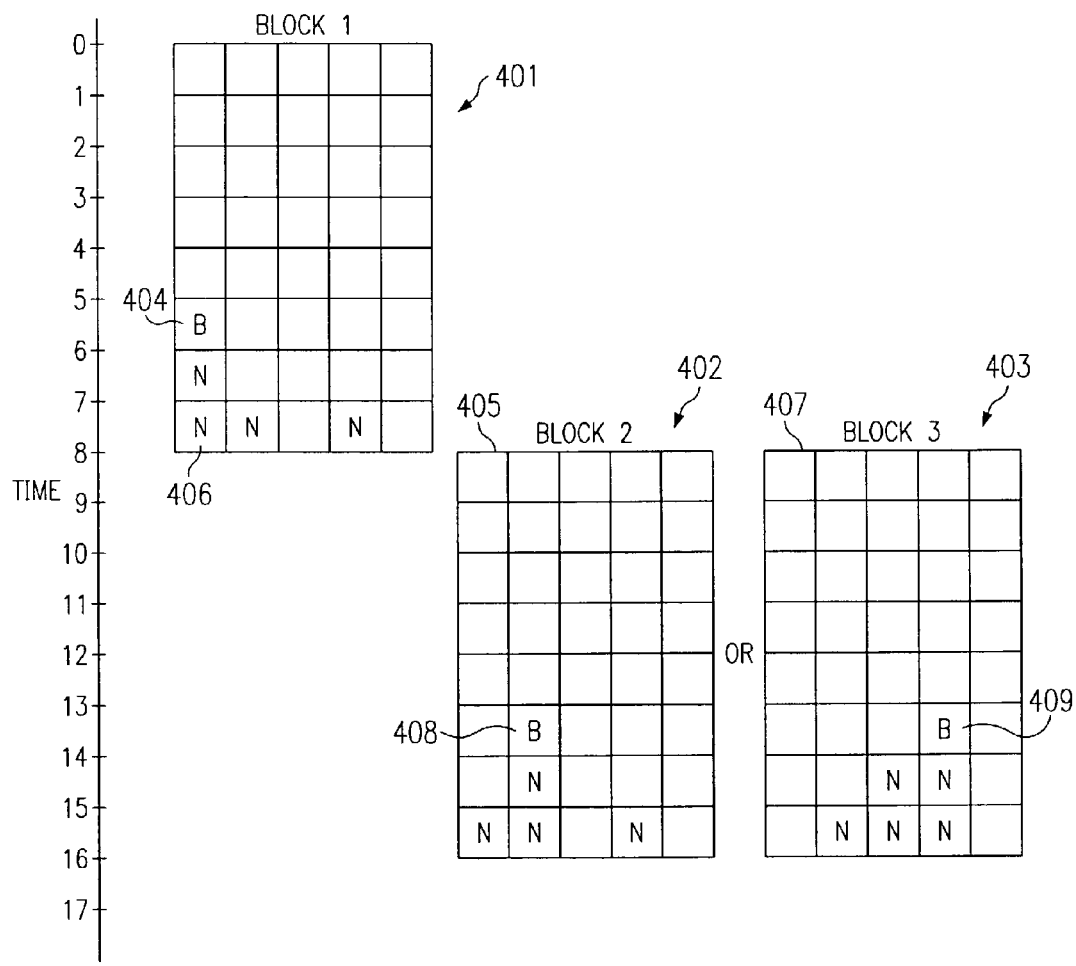
FIG. 4 is a block diagram of an example of a prior art program schedule.

Referring to FIG. 3, which depicts an example 30 of the operation of the invention during compilation and execution of a program, the invention begins execution of the program in step 34, which would include the basic blocks of FIG. 1. As shown in FIG. 1, the first processing element forms a conditional branch B 104 while processing the $5^{th}$ cycle of basic block 1 101. Referring to FIG. 3, this occurs in step 35. This conditional branch may lead to processing of block 2 102 or block 3 103, depending upon whether the condition is satisfied or not. For example, block 2 102 may be processed if the condition is not satisfied, i.e. falls through, and block 3 103 may be processed if the condition is met, i.e. branch taken. Note that the fall-though block is normally contiguous in memory with the prior block from which the branch was issued.

The branching processor would send the branch to the other processors, as indicated by step 36 of FIG. 3. The invention allows the first processing element to immediately move to either block 2 or block 3, and thus, does not have to wait 3 cycles, the time needed to branch from the first processing element to the fifth processing element, or until all of the other processing elements have received the branch. Other processing elements will move to the appropriate block upon receipt of the branch. For example, the second processing element moves from block 109 to either block 2 110 or block 3 113 one cycle after the first processing element. Thus, the time at which block 2 is reached is not identical to, and is independent of, the time that block 3 is reached. This independent branching by the processors is shown as step 37 of FIG. 3.

Within 4 cycles, all of the processing elements have moved to either block 2 or block 3 and commenced executing the code of the branched to block, as indicated by step 38 of FIG. 3. For example, the first processing element starts execution at either location 105 or 106, of blocks 2 or 3, respectively. During processing of block 2 or block 3, another branch would be encountered, e.g. branch 107 or 108, which would change the flow of the program to other basic blocks (not shown). The processing elements would immediately move to the other blocks after receiving the branch instruction. Any of these other basic blocks may contain a branch that causes the program to generate a branch 35 again repeating the process until the program terminates. The processing elements would continue with the execution of the program to the logical end of the program, as shown by step 39 of FIG. 3. In some systems, the number of processing elements and their branch latencies may change during program execution. In such cases, on-line recompilation is used as the program may return to the compilation step 31, regenerate branch latency tables, and resume execution of a program that is recompiled with a new latency configuration.

The branch latency preferably is represented by a variable, e.g. a branch latency vector for each of the processing elements that might originate a branch. This vector would describe the time for a branch to move from an originating processing element to each of the destination processing elements. In the example shown in FIG. 1, the branch latency vector (BLV(j)) for the first processing element would be BLV(1)=(1, 2, 3, 3, 4). For the second processing element, the vector would be BLV(2)=(2, 1, 2, 3, 4), and for the fourth processing element the vector would be BLV(4)= (3, 3, 2, 1, 2). Each entry in the vector indicates the latency of the corresponding column with respect to issuing a branch in the jth column. Note that it is assumed that every branch takes a shortest path through the branch transport network and the traversal of each branch transport node takes one cycle. In general, each processing element j, that executes a branch, will have a distinct branch latency vector BLV(j). The vector defines the distinct number of branch delay slots or cycles for each of the processing elements for a branch from the originating processing element. Thus, the vector defines the start times for the processing elements to begin processing the branched-to basic block. The compiler preferably forms the vectors, and preferably stores the vectors in a branch latency table. The compiler preferably forms the vectors prior to (or contemporaneous to) scheduling. Referring to FIG. 3, this is shown in step 32.

The vector for the first processing element is used to structure the code for the branch in block 1, while the vectors for the second and fourth processing elements are used to structure code for the branches in blocks 2 and 3, respectively. Note that the vector affects the ending of the current basic block and the beginning of the next basic block or blocks. Thus, the branch 104 affects the ending of block 1 and the beginnings of blocks 2 and 3, while branch 107 affects the ending of block 2 (and the beginning of a block that is not shown). Similarly, branch 108 affects the ending of block 3 (and the beginning of a block that is not shown). Note that the beginnings of the branched-to blocks, e.g. blocks 2 and 3, match the ending of the branching block, e.g. block 1. Note that, in this example machine, the originating processing element can respond to a branch on the next cycle, so the originating processing element has a latency of 1.

A compiler, using the vectors, can schedule the execution of the program with respect to the processing elements. Referring to FIG. 3, this is shown in step 33. For example, the compiler can schedule work for basic block 1 to be performed by the second processing element for up to one cycle after the branch 104. However, after that one cycle, the compiler should then schedule only work for the second or third basic blocks. So in this manner, the compiler may create a static schedule which carefully acknowledges when the branches occur, and where processing is to be assigned within the basic blocks to accommodate the branches.

Figure 2:
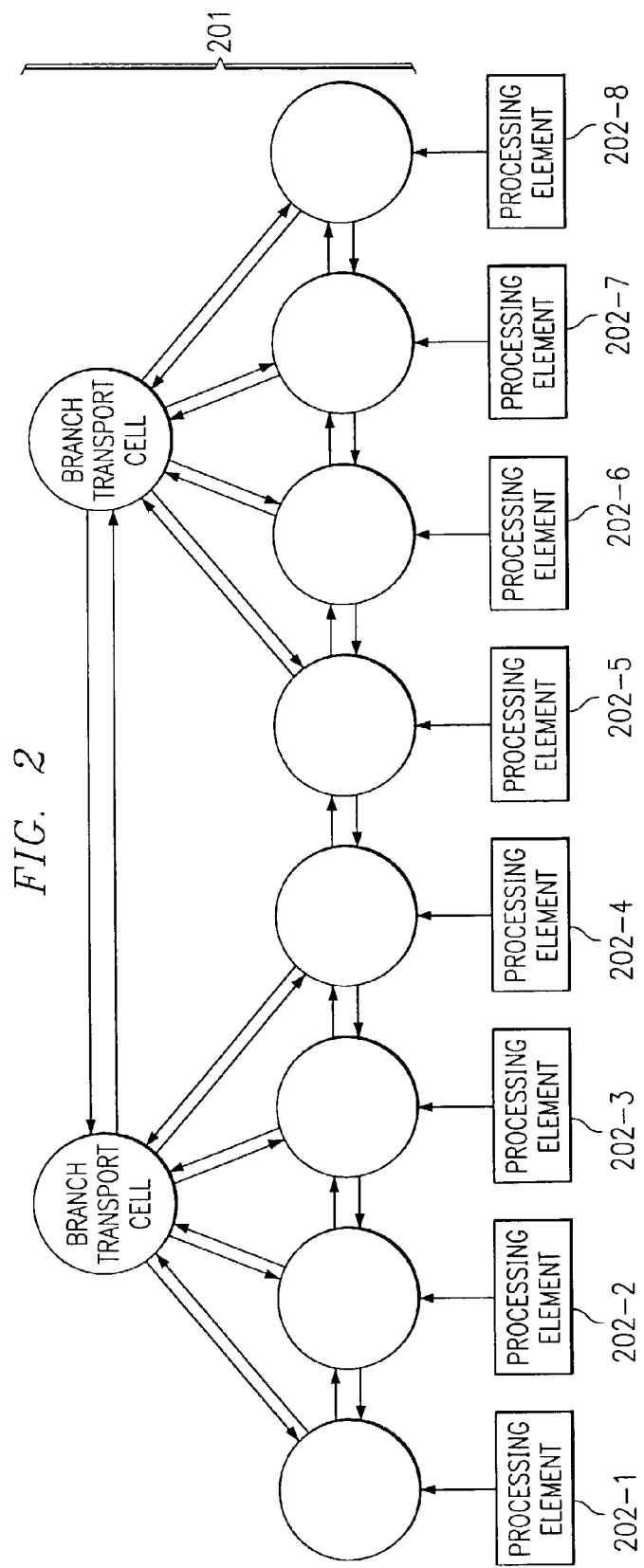
FIG. 2 is a block diagram of an example of a computer system operating with the schedule of FIG. 1, according to an embodiment of the invention.

FIG. 2 depicts an example of an arrangement of a branch transport network 201 for a plurality of processing elements 202-1 to 202-N that can be used with the schedule of FIG. 1. Note that FIG. 1 uses five processing elements, while FIG. 2 depicts more processing elements. The additional processing elements may be used to handle other programs. Additional information on configuring the branch transport cells and the processor elements is described in related application entitled "Branch Reconfigurable Systems and Methods," Ser. No. 10/124,990 and hereby incorporated herein by reference. Note that the hardware in embodiments of the present invention preferably do not include the latency buffers of this related application.

Each of the processing elements 202 includes an instruction memory for holding instructions to be processed by its function unit. When a branch command is executed by one of the processing elements, the name of the branch-to basic block is transmitted to the desired processing elements. This named program location is translated (e.g. by content addressable RAM or table lookup) to potentially distinct actual program locations within each of the separate instruction memories for each of the branch units. After the new branch target is reached, each of the processing elements begins independently sequencing through the code from the branch-to basic block.

What is claimed is:

1. A method for executing a program that comprises a plurality of basic blocks on a computer system that comprises a plurality of processing elements:
   generating a branch target address by one processing element of the plurality of processing elements;
   sending the branch target address to at least one other processing element of the plurality of processing elements; and
   independently branching to a target of the branch target address by each of the processing elements of the plurality of processing elements when each processing element receives the sent branch target address;
   wherein at least one processing element of the plurality of processing elements receives the branch target address at a time later than another processing element of the plurality of processing elements.

2. The method of claim 1, further comprising:
   after branching, executing a basic block located at the target by each processing element of the plurality of processing elements.

3. The method of claim 1, wherein the sending comprises:
   transporting the branch target address by a network.

4. The method of claim 1, wherein:
   the computer system is a VLIW system.

5. The method of claim 1, further comprising:
   forming a branch latency table for the system.

6. The method of claim 5, wherein the table comprises a plurality of branch vectors that describe a latency for sending the branch target address from the one processing element to each processing element of the plurality of processing elements.

7. The method of claim 5, wherein:
   the forming a branch latency table is performed by a compiler.

8. The method of claim 1, wherein:
   the program is statically scheduled by a compiler.

9. The method of claim 8, further comprising:
   scheduling the program without padding branch latency time.

10. The method of claim 1, wherein:
    the branch generating the branch target address is a conditional branch that has at least two targets, wherein selection of each target is dependent upon satisfaction of a condition.

11. A system for executing a program that comprises a plurality of basic blocks, the system comprising:
    a plurality of processing elements, wherein at least one processing element of the plurality of processing elements generates a branch target address during processing of a basic block; and
    a branch transport network that delivers the branch target address to at least one other processing element of the plurality of processing elements;

wherein the at least one processing element and the at least one other processing element branch to a target of the branch target address independently of each other; and wherein the at least one other processing element receives the branch target address at a time different from the one processing element.

12. The system of claim 11, wherein:
the computer system is a VLIW system.

13. The system of claim 11, further comprising:
a branch latency table having at least one branch vector that describe a latency for sending the branch target address from the at least one processing element to the at least one other processing element.

14. The system of claim 13, wherein:
the branch latency table is formed by a compiler.

15. The system of claim 11, wherein:
the program is statically scheduled by a compiler.

16. The system of claim 11, wherein:
the branch generating the branch target address is a conditional branch that has at least two targets, wherein selection of each target is dependent upon satisfaction of a condition.

17. A computer program product having a computer readable medium having computer program logic recorded thereon for executing a program that comprises a plurality of basic blocks on a computer system that comprises a plurality of processing element, the computer program product comprising:
means for sending a branch target address generated by one processing element of the plurality of processing elements from processing a basic block to at least one other processing element;
means for branching to a target of the branch target address by the one processing element; and
means for branching to the target of the branch target address by the at least one other processing element, which is independent of the means for branching to the target of the branch target address by the one processing element;
wherein at least one other processing element of the plurality of processing elements receives the branch target address at a time different from the one processing element.

18. The computer program product of claim 17, further comprising:
means for executing the basic block located at the target by the one processing element after branching; and
means for executing the basic block located at the target by the at least one other processing element after branching.

19. The computer program product of claim 17, further comprising:
means for describing a latency for sending the branch target address from the one processing element to the at least one other processing element.

20. The computer program product of claim 19, further comprising:
means for scheduling the program without padding branch latency time that uses the means for describing.

21. The method of claim 1, wherein any of said plurality of processing elements can generate a branching instruction.

22. The method of claim 11, wherein any of said plurality of processing elements can generate a branching instruction.

23. The method of claim 17, wherein any of said plurality of processing elements can generate a branching instruction.

* * * * *